(12) United States Patent
Keshav et al.

(10) Patent No.: US 8,412,101 B1
(45) Date of Patent: *Apr. 2, 2013

(54) OPTIMALLY CONTROLLING SHORT-RANGE WIRELESS COMMUNICATION ON MOBILE COMMUNICATION DEVICES

(75) Inventors: Srinivasan Keshav, Waterloo (CA); Andrey Szpynda, Missisauga (CA)

(73) Assignee: Bee Networx Inc., Vaughan, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/459,029

(22) Filed: Apr. 27, 2012

Related U.S. Application Data

(63) Continuation of application No. 12/775,435, filed on May 6, 2010, now Pat. No. 8,190,088, which is a continuation of application No. 12/537,777, filed on Aug. 7, 2009, now abandoned.

(60) Provisional application No. 61/087,133, filed on Aug. 7, 2008.

(51) Int. Cl.
*H04B 7/00* (2006.01)

(52) U.S. Cl. ............... 455/41.2; 455/41.1; 455/41.3
(58) Field of Classification Search ......... 455/41.1–41.3
See application file for complete search history.

(56) References Cited

U.S. PATENT DOCUMENTS

2010/0162105 A1* 6/2010 Beebe et al. ............ 715/273
2011/0047552 A1* 2/2011 Mergen et al. .......... 718/102

* cited by examiner

*Primary Examiner* — Tuan H Nguyen
(74) *Attorney, Agent, or Firm* — Brill Law Office; Jeffrey Brill

(57) ABSTRACT

The short-range wireless communication on a mobile communication device is optimized to balance between preserving battery power and processing urgent data without delay. A wireless access schedule identifying time periods during which the mobile communication device is assumed to have access to short-range wireless communication is created or provided. Data to be transmitted or received by the mobile communication device is classified as being urgent or non-urgent. When data is to be transmitted or received by the mobile communication device, the transmission or receipt of the data is managed according to 1) whether or not the data is urgent, and 2) whether the current time is within a time period during which the mobile communication device is assumed to have access to short-range wireless communication.

20 Claims, 2 Drawing Sheets

OPTIMALLY CONTROLLING SHORT-RANGE WIRELESS COMMUNICATION ON MOBILE COMMUNICATION DEVICES

PRIORITY CLAIM

This patent application is a Continuation of commonly assigned patent application Ser. No. 12/775,435 filed on May 6, 2010 now U.S. Pat. No. 8,190,088, titled "Optimally Controlling Short-range Wireless Communication on Mobile Communication Devices" (the "First Continuation Application"). The First Continuation application is a Continuation of commonly assigned patent application Ser. No. 12/537,777, filed on Aug. 7, 2009 now abandoned, titled "Optimally Controlling Short-range Wireless Communication on Mobile Communication Devices" (the "Parent Application"). This patent application claims the benefit of the earlier filing date of the First Continuation Application, which in turn claims the benefit of the earlier filing date of the Parent Application, which in turn claims the benefit of provisional application Ser. No. 61/087,133, titled "Controlling Short-range Wireless Network Interface Cards for Mobile Devices," filed on Aug. 7, 2008 ("the Provisional Application"). The entirety of the Provisional Application is hereby incorporated by reference.

TECHNICAL FIELD

This disclosure pertains generally to mobile communication devices, and more specifically to optimally controlling short-range wireless communication o mobile communication devices.

BACKGROUND

The use of highly-capable mobile communication devices such as the iPhone®, the BlackBerry® and the Treo® is increasing rapidly. Such devices often transmit and receive large amounts of data such as video and audio clips, photographs and email attachments. Although contemporary mobile communication devices are capable of creating and utilizing these types of media content, they do not intelligently use the communication media available to them to optimize transmission and receipt of media files. Instead, mobile communication devices tend to immediately send or receive data, insensitive to the cost charged by operators, the type of service currently available or the remaining battery life. This can result not only in large bills for consumers, but also in the rapid loss of battery life, making the device useless until it is recharged. These problems are exacerbated by factors such as the proliferation of connectivity options, the wide variations in carrier data plans and treatments of device roaming, transient appearance and disappearance of short-range wireless connectivity and the need to balance user expectations and device capabilities.

Given the free or low-cost of 802.11 (WiFi) communication, it is advantageous to use this technology to transfer data items to and from mobile communication devices. However, the coverage area of a WiFi access point is quite small, and depending upon the user's location, WiFi access is often not available. Moreover, leaving the WiFi network interface card (NIC) on all the time wastes a lot of energy, and drains the battery. Therefore, it would be desirable for a mobile communication device to know just when to turn on the WiFi NIC and when to turn it off.

One option today is to leave the WiFi NIC on all the time, which causes the device to rapidly lose its stored battery charge. Another option is to ask the user of the device to manually turn the WiFi NIC on and off, which places a burden on the user. The WiFi NIC can also be turned off a short time after the last use, but this prevents the device from receiving incoming information when the user is not interacting with it, thus reducing the ability of the device to opportunistically communicate with the infrastructure. It would be desirable to address these shortcomings.

SUMMARY

The short-range wireless communication on a mobile communication device is optimized to balance between preserving battery power and processing urgent data without delay. A wireless access schedule identifying time periods during which the mobile communication device is assumed to have access to short-range wireless communication is created or provided. Data to be transmitted or received by the mobile communication device is classified as being urgent or non-urgent. When data is to be transmitted or received by the mobile communication device, the transmission or receipt of the data is managed according to 1) whether or not the data is urgent, and 2) whether the current time is within a time period during which the mobile communication device is assumed to have access to short-range wireless communication. For example, if the current time is not within a time period during which the mobile communication device is assumed to have access to short-range wireless communication but the data is urgent, the mobile communication device scans for access to short-range wireless communication, and attempts to transmit or receive the data. On the other hand, if the current time is not within a time period during which the mobile communication device is assumed to have access to short-range wireless communication but the data is non-urgent, the mobile communication device waits for the next period of time during which it is assumed to have access to short-range wireless communication before attempting to transmit or receive the data.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the subject matter, resort to the claims being necessary to determine such subject matter.

The Figures depict various embodiments for purposes of illustration only. One skilled in the art will readily recognize from the following discussion that other embodiments of the structures and methods illustrated herein may be employed without departing from the described principles.

DETAILED DESCRIPTION

Figure 1:
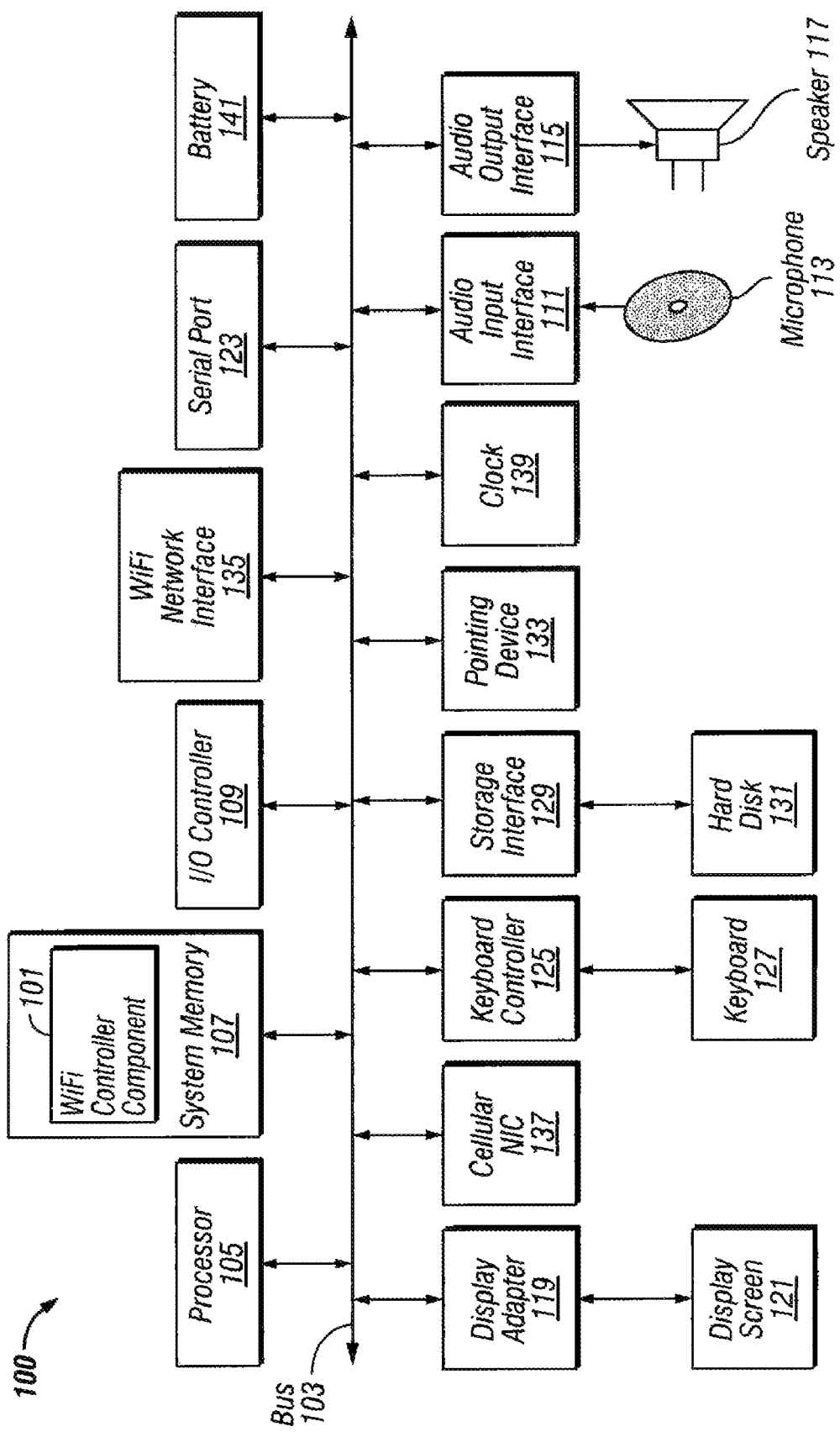
FIG. 1 is a block diagram of a mobile communication device suitable for implementing a WiFi controller component, according to some embodiments.

FIG. 1 is a block diagram of a mobile communication device 100 suitable for implementing a WiFi controller component 101. As used herein the term "mobile communication device 100" means a battery 141 powered computing device with network access that can be practicably moved between and used in different physical locations. Examples of mobile communication devices 100 include but are not limited to, smart-phones, personal digital assistants, netbook computers, laptop computers, etc. As illustrated, one component of the mobile communication device 100 is a bus 103. The bus 103 communicatively couples other components of the mobile communication device 100, such as at least one processor 105, system memory 107 (e.g., random access memory (RAM), read-only memory (ROM), flash memory), an input/output (I/O) controller 109, an audio input interface 111 communicatively coupled to an audio input device 113 such as a microphone, an audio output interface 115 communicatively coupled to an audio output device 117 such as a speaker, a display adapter 119 communicatively coupled to a video output device such as a display screen 121, one or more interfaces 123 such as serial ports, Universal Serial Bus (USB) receptacles, etc., a keyboard controller 125 communicatively coupled to a keyboard 127, a storage interface 129 communicatively coupled to at least one hard disk 131 (or other form(s) of magnetic, optical and/or other type of storage media), a pointing device 133 coupled to the bus 103, a WiFi network interface card (NIC) 135 or other form of WiFi NIC 135, coupled, e.g., directly to the bus 103, one or more other types of NICs 137 or similar (e.g., for interfacing with network types such as cellular, wired, etc.), a clock 139 (e.g., a timing circuit) and a rechargeable power source such as a battery 141. All of the components illustrated in FIG. 1 need not be present. Furthermore, the components can be interconnected in different ways from that shown in FIG. 1.

The bus 103 allows data communication between the processor 105 and system memory 107, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., magnetic or optical disk 131) and loaded into system memory 107 and executed by the processor 105. Application programs can also be loaded into system memory 107 from a remote location (i.e., a remotely located computing device), for example via a NIC 135. In FIG. 1, the WiFi controller component 101 is illustrated as residing in system memory 107. The workings of the WiFi controller component 101 are explained in greater detail below in conjunction with FIG. 2.

The storage interface 129 is coupled to one or more hard disks 131 (and/or other storage media). The network interface(s) 135, 137 can be directly or indirectly communicatively coupled to a network such as the Internet. Such coupling can be wired or wireless.

Figure 2:
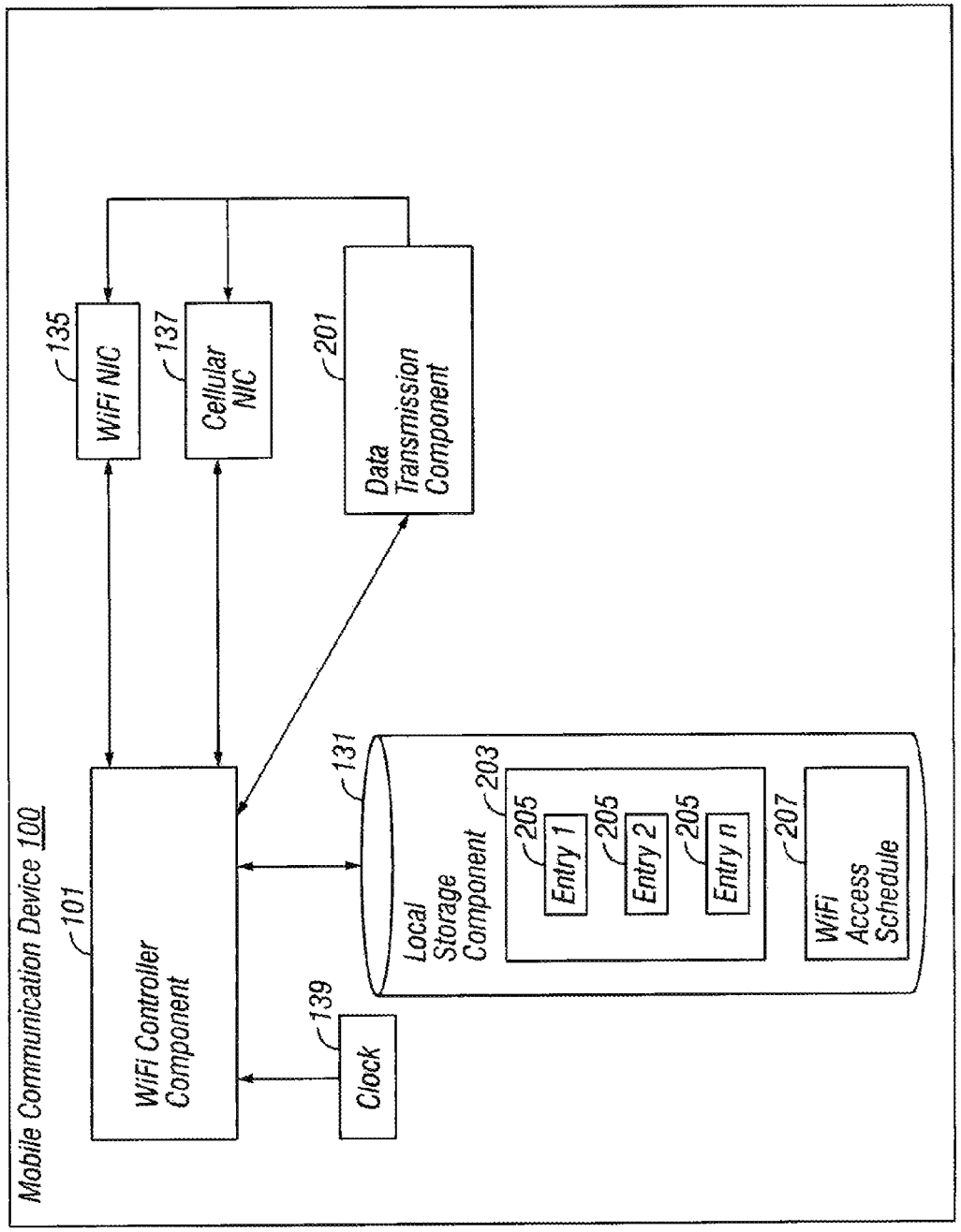
FIG. 2 is a block diagram of illustrating the operations of a WiFi controller component, according to some embodiments.

FIG. 2 illustrates a WiFi controller component 101, according to some embodiments. The WiFi controller component 101 is illustrated as residing on a mobile communication device 100. It is to be understood that although the WiFi controller component 101 is illustrated in FIG. 2 as a separate entity, the illustrated WiFi controller component 101 represents a collection of functionalities, which can be instantiated as fewer, more or overlapping components as desired. It is to be understood that the components of the WiFi controller component 101 can be instantiated (for example as object code or executable images) within the system memory 107 (e.g., RAM, ROM, flash memory) of a mobile communication device 100 (or other type of computing device), such that when the processor 105 of the mobile communication device 100 processes a component, the mobile communication device 100 executes the associated functionality. Additionally, program code to implement the functionalities of the WiFi controller component 101 can be stored on computer-readable storage media, such that the program code can be loaded from the computer-readable storage media into the system memory 107 of a mobile communication device 100 (or other type of computing device), and executed by its processor 105. Any form of tangible computer readable storage medium can be used in this context, such as magnetic or optical storage media. As used herein, the term "computer readable storage medium" does not mean an electrical signal separate from an underlying physical medium. As used herein, the terms "computer system," "computer," and "computing device" mean one or more computers configured and/or programmed to execute the described functionality.

As described in detail below, the WiFi controller component 101 on a mobile communication device 100 is able to turn on the WiFi NIC 135 at times when there is a near certain expectation that WiFi coverage is present. This allows the mobile communication device 100 to use inexpensive WiFi communication without leaving the WiFi NIC 135 on all the time, or requiring the user to turn it on and off or otherwise intervene with its operation.

Most users of mobile communication devices 100 have rather predictable routines, which typically involve long blocks of time at home and/or at work, where WiFi coverage is present. The consequence is that for any given mobile communication device 100 user, there are typically several long-stay locations with WiFi coverage, and many short-stay locations, which may or may not have WiFi coverage. If the WiFi NIC 135 is turned on during one or more of the time periods at which the user is located at a long-stay location with WiFi coverage, WiFi connectivity will almost certainly be available. By using a combination of a user's observed history and scanning for WiFi connectivity, the WiFi controller component 101 is able to identify these time periods, as described in more detail below.

As illustrated in FIG. 2, in addition to the WiFi controller component 101, also present on the mobile communication device 100 are a WiFi NIC 135, a data transmission component 201, a clock 139, and a local storage component 131 (e.g., a hard drive or similar). The WiFi controller component 101 has access to the clock 139, and is thus able to determine the current time. The WiFi controller component 101 also has read and write access to the local storage component 131. Additionally, the WiFi controller component 101 has the ability to turn on and off the WiFi NIC 135, and to scan for available Service-Specific Identifiers (SSIDs). (A SSID is a unique identifier of a wireless local area network.) Note that just because a SSID is detected as being available (i.e., "on the air") does not mean that the detected SSID is necessarily usable by the specific mobile communication device 100. For example, the detected SSID could be associated with a company's proprietary wireless network and require a password for access. If the mobile communication device 100 happens to be in range of that proprietary wireless network at the time of a scan, the associated SSID will show up as being "available," but will not be usable by the mobile communication device 100. As explained in greater detail below, the WiFi controller component 101 can determine which wireless networks are currently available, and identify specific ones of those that are usable by the mobile communication device 100. In some embodiments, the WiFi controller component 101 also interacts with a Cellular NIC 137 present on the mobile communication device 100, and identifies available cellular tower identifiers.

In one embodiment, during an initial period of usage (e.g., five days, one week, ten days, etc.) the WiFi controller component 101 runs in a training mode. In this training mode, the WiFi controller component 101 turns on the wireless NIC 135 periodically (e.g., every thirty seconds, every minute, every five minutes, etc.), notes the current time and scans for available SSIDs. In some embodiments the WiFi controller component 101 also scans for available cellular tower identifiers. The WiFi controller component 101 writes an entry 205 into a log 203 maintained on the local storage component 131. The log 203 contains one entry 205 for each such period. Each entry 205 documents the current time, the SSIDs seen during the scan (if any), and in some embodiments any cellular tower identifiers seen as well.

At the end of the training period, the WiFi controller component 101 analyzes the log 203 to determine the user's expected WiFi access schedule 207. In some embodiments the WiFi controller component 101 optionally separates the log 203 into multiple sub-traces (not illustrated), where each sub-trace represents a typical user activity mode. For example, the log 203 may be separated into weekday and weekend sub-traces. This allows the WiFi controller component 101 to determine separate user WiFi access schedules 207 for weekdays and weekends.

To analyze the log 203 (or each sub-trace thereof if the analysis is being conducted at that level), the WiFi controller component 101 identifies the SSIDs seen at the time of each entry 205 in the log 203 (or sub-trace). The WiFi controller component 101 then computes the number of times each SSID appears in the log 203 (or sub-trace). The WiFi controller component 101 ignores any SSIDs that appear at a frequency below a particular threshold (e.g., once per week, five times per week, eight times per week, etc.). This eliminates outlying SSIDs from the analysis. Subsequently, the WiFi controller component 101 applies a standard clustering algorithm to find periods of time when the mobile communication device 100 has access to the same or nearly same set of SSIDs. A number of such clustering algorithms are known to those of ordinary skill in the relevant art, and the implementation thereof within the described context will be readily apparent to those of such a skill level in light of this disclosure. Once the WiFi controller component 101 has identified these periods of time, it saves the start and end of each such time period and the set of SSIDs available therein (for each sub-trace, if applicable) to the local storage component 131. These are the periods in which the user is located in a long-stay location with WiFi coverage, and thus during which the availability of WiFi connectivity can be assumed. The SSIDs detected as being available during such a time period are assumed to be usable. In some embodiments, the WiFi controller component 101 also identifies and saves periods of time when the mobile communication device 100 does not have access to any usable SSIDs. These periods are classified as disconnection periods, and this information can be stored locally as well. Moreover, in some embodiments, the WiFi controller component 101 also analyzes the cellular tower identifiers seen at various times, and determines which cellular tower identifiers have a pattern of being available when at least one usable SSID is also available. This information concerning cellular tower identifiers is also stored, and its use is described below. In this manner, the WiFi controller component 101 creates a WiFi access schedule 207 of varying degrees of detail, and stores the WiFi access schedule 207 locally.

In some embodiments, after (and/or during) the training phase, the WiFi controller component 101 optionally displays the created WiFi access schedule 207 to the user for confirmation, e.g., through a user interface on the display screen 121. In such embodiments, the user can make modifications to the WiFi access schedule 207 as desired. Specifically, the user can add, edit and/or delete stored entries and time period information. In some embodiments, no training period occurs at all. In such embodiments, a user, administrator or the like simply enters a WiFi access schedule 207, e.g., through a user interface. Default WiFi access schedules 207 can also be used.

Once a WiFi access schedule 207 has been created or otherwise established, the WiFi controller component 101 works in an operational mode. At start-up the WiFi controller component 101 can check to see if it has access to a clock 139. If the WiFi controller component 101 cannot access a clock 139, it can terminate with an error. The WiFi controller component 101 can also check for the presence of at least one usable SSID associated with a WiFi access schedule 207 on the local storage component 131. If no such SSID is found, the WiFi controller component 101 can wait until such a SSID is entered before entering operational mode.

In one embodiment, the data transmission component 201 of the mobile communication device 100 classifies data to be transmitted as either urgent or non-urgent (i.e., assigns units of data to be transmitted an urgency rating of urgent or non-urgent). Delays in transmitting urgent data are to be minimized, even at the expense of the life of the battery 141. In the case of non-urgent data, transmission delays can be tolerated. In either case, whenever there is data to be transmitted and the WiFi NIC 135 is not already on, the data transmission component 201 queries the WiFi controller component 101 as to whether the WiFi NIC 135 can or should be turned on.

Responsive to receiving such a query, the WiFi controller component 101 determines the current time from the clock 139. The WiFi controller component 101 also reads the locally stored WiFi access schedule 207 to determine whether the current time is within a period of expected WiFi connectivity. Note that in embodiments in which distinctions are made between modes within a WiFi access schedule 207 (e.g., weekday versus weekend), the WiFi controller component 101 determines the current mode, and takes that into account when determining whether the current time is within a period of WiFi connectivity.

If the current time is within such a period, the WiFi NIC 135 is expected to be usable. In this case, for both urgent and non-urgent data, the WiFi controller component 101 turns on the WiFi NIC 135, and goes into scan mode, which is described below. If the current time is outside of a WiFi access schedule 207 indicated period of WiFi connectivity, the WiFi controller component 101 checks if the data to be transmitted is urgent or not. If the data is not urgent, the WiFi controller component 101 informs the data transmission component 201 to defer the data transmission until the start of the next expected period of WiFi connectivity, as determined from the stored WiFi access schedule 207 (this may result in the data transmission component 201 transmitting the data on another NIC 137, if one is available).

On the other hand, if the data to be transmitted is urgent, it is desirable to attempt to transmit it as soon as possible, even at the expense of possibly wasting some battery 141 power. However, it is still desirable to use as little battery 141 power as possible, so the WiFi controller component 101 does what it can to minimize the chances of turning on the WiFi NIC 135 when WiFI connectivity is not available. To this end, in embodiments in which the WiFi access schedule 207 includes disconnection periods, the WiFi controller component 101 determines whether the current time is within such a disconnection period, and if so informs the data transmission component 201 to defer the transmission of the urgent data until after the end of the disconnection period. If the current time is not within a disconnection period, processing proceeds as below.

In embodiments in which the WiFi access schedule 207 includes information concerning cellular tower identifiers associated with usable SSIDs, the WiFi controller component 101 checks whether any cellular tower identifiers are currently available. This is an inexpensive operation to perform, because cellular towers constantly broadcast their identifiers, and the cellular NIC 137 of the wireless communication device 100 is typically on to facilitate cellular voice communication. If one or more cellular tower identifiers are currently available, the WiFi controller component 101 determines whether any of the available cellular tower identifier(s) are associated with the availability of a usable SSID. Such an association does not guarantee that a usable SSID will be available currently, but it indicates enough of a statistical likelihood that this is so to justify turning on the WiFi NIC 135 to check. Therefore, if a currently available cellular tower identifier is associated with the availability of at least one usable SSID, the WiFi controller component 101 goes into scan mode, as described below. On the other hand, if such an association is not present, the WiFi controller component 101 informs the data transmission component 201 to defer the data transmission until the start of the next expected period of WiFi connectivity. Note that in an embodiment in which the WiFi access schedule 207 does not include information concerning cellular tower identifiers associated with usable SSIDs, the WiFi controller component 101 can simply go into scan mode responsive to a request to transmit urgent data outside of a disconnection period.

Additionally, data to transmit can be classified according to additional levels of urgency (e.g., non-urgent, urgent, very urgent, extremely urgent). In such cases, the specific steps to take to balance the conservation of battery 141 power associated with turning on the WiFi NIC 135 with the urgency of the transmission is a variable design choice within the context described herein. For example, non-urgent and urgent data could be processed as described above, whereas the WiFi controller component 101 could go into scan mode for very urgent data unless the current time is within a disconnection period and for extremely urgent data anytime. The implementation of similar variations within the context of the present invention will be readily apparent to those of ordinary skill in the relevant art in light of this specification.

In scan mode, the WiFi controller component 101 turns on the WiFi NIC 135 briefly, scans for available SSIDs and checks if any seen SSID is one known to be usable. If not, the WiFi NIC 135 cannot be used, and thus the WiFi controller component 101 turns it off immediately. In this case, after a given interval of time (e.g., three minutes, five minutes, ten minutes), the WiFi controller component 101 turns on the WiFi NIC 135 again and tries to find a usable SSID. Scan mode ends when a usable SSID is found, at which point the WiFi controller component 101 leaves the WiFi NIC 135 turned on and informs the data transmission component 201 that it is ready for use. After the data transmission component 201 finishes its transmission, the WiFi controller component 101 turns off the WiFi NIC 135. In some embodiments, scan mode can time out if no usable SSID is found within a given period of time (e.g., thirty minutes, sixty minutes, ninety minutes). When scan mode times out, the WiFi controller component 101 turns off the WiFi NIC 135 and informs the data transmission component 201 to defer the data transmission until the start of the next expected period of WiFi connectivity.

The WiFi controller component 101 applies symmetric logic when the data transmission component 201 attempts to receive data. When the data transmission component 201 attempts to receive data, a standard communication channel, such as Short Message Service, typically enables the data transmission component 201 to determine that there is data to be received. In other embodiments, the data transmission component 201 may automatically and periodically check for data awaiting reception. In yet another embodiment, the user may explicitly request that the data transmission component 201 check for data to be received.

In any of these cases, the data transmission component 201 may desire to receive data over the WiFi NIC 135 when it is turned off. To do so, the data transmission component 201 checks with the WiFi controller component 101 as to whether the WiFi NIC 135 can or should be turned on. The WiFi controller component 101 executes subsequent processing as described above to determine whether WiFi connectivity is available and to control the WiFi NIC 135 to balance battery 141 life against attempting to receive incoming data based on urgency.

In one embodiment, the WiFi controller component 101 further detects when the mobile communication device 100 is physically connected to a wired network (e.g., the mobile communication device 100 is docked to another computing device with a wired network connection). In this embodiment, when the WiFi controller component 101 detects that a wired network connection is available, the WiFi controller component 101 informs the data transmission component 201 to use the wired network connection to transmit and receive all network traffic for as long as the wired network connection is available. Because wired network connections are typically less expensive to use and faster than wireless ones, it is desirable to use the wired connection to process as much network traffic as possible when it is available.

It is to be understood that for readability and ease of understanding, the present specification frequently refers to WiFi NICs 135. In some embodiments, other types of WiFi interfaces are used. Additionally, although the present specification frequently refers to WiFi short-range wireless communication, it is to be understood that in other embodiments, other inexpensive, short-range wireless communication protocols (e.g., Bluetooth) can be used instead of or in addition to WiFi.

As will be understood by those familiar with the art, the claimed subject matter may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the claimed subject matter or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for controlling short-range wireless communication on a mobile communication device, the method comprising:
   accessing, by the mobile communication device, a wireless access schedule, the wireless access schedule identifying at least one time period during which the mobile communication device is assumed to have access to short-range wireless communication;
   responsive to an indication that a unit of data is to be communicated between the mobile communication device and a remote computing device, determining, by the mobile communication device, a current time, and whether the current time is within a time period during which the mobile communication device is assumed to have access to short-range wireless communication; and
   managing, by the mobile communication device, the communication of the unit of data with the remote computing device according to whether the current time is within a time period during which the mobile communication device is assumed to have access to short-range wireless communication.

2. The method of claim 1 further comprising:
   assigning, by the mobile communication device, urgency ratings to units of data to be communicated between the mobile communication device and remote computing devices; and
   managing, by the mobile communication device, the communication of the unit of data with the remote computing device according to 1) the urgency rating of the unit of data and 2) whether the current time is within a time period during which the mobile communication device is assumed to have access to short-range wireless communication.

3. The method of claim 2 wherein managing, by the mobile communication device, the communication of the unit of data with the remote computing device according to 1) the urgency rating of the unit of data and 2) whether the current time is within a time period during which the mobile communication device is assumed to have access to short-range wireless communication further comprises performing a step from a group of steps consisting of:
   responsive to the current time not being within a time period during which the mobile communication device is assumed to have access to short-range wireless communication and to the unit of data being rated as urgent, scanning, by the mobile communication device, for access to short-range wireless communication; and
   responsive to the current time not being within a time period during which the mobile communication device is assumed to have access to short-range wireless communication and to the unit of data being rated as non-urgent, waiting for a period of time during which the mobile communication device is assumed to have access to short-range wireless communication to attempt to communicate with the remote computing device, by the mobile communication device.

4. The method of claim 2 wherein managing, by the mobile communication device, the communication of the unit of data with the remote computing device according to 1) the urgency rating of the unit of data and 2) whether the current time is within a time period during which the mobile communication device is assumed to have access to short-range wireless communication further comprises:
   responsive to the current time not being within a time period during which the mobile communication device is assumed to have access to short-range wireless communication and to the unit of data being rated as urgent, determining, by the mobile communication device, whether at least one cellular tower identifier associated with availability of at least one usable identifier of a wireless local area network is currently available.

5. The method of claim 4 further comprising performing a step from a group of steps consisting of:
   responsive to at least one cellular tower identifier associated with availability of at least one usable identifier of a wireless local area network currently being available, scanning, by the mobile communication device, for access to short-range wireless communication; and
   responsive to no cellular tower identifier associated with availability of at least one usable identifier of a wireless local area network currently being available, waiting for a period of time during which the mobile communication device is assumed to have access to short-range wireless communication to attempt to communicate with the remote computing device, by the mobile communication device.

6. The method of claim 1 wherein managing, by the mobile communication device, the communication of the unit of data with the remote computing device according whether the current time is within a time period during which the mobile communication device is assumed to have access to short-range wireless communication further comprises:
   responsive to the current time being within a time period during which the mobile communication device is assumed to have access to short-range wireless communication, scanning, by the mobile communication device, for access to short-range wireless communication.

7. The method of claim 1 wherein managing, by the mobile communication device, the communication of the unit of data with the remote computing device according to whether the current time is within a time period during which the mobile communication device is assumed to have access to short-range wireless communication further comprises further comprising performing a step from a group of steps consisting of:
   scanning, by the mobile communication device, for access to short-range wireless communication; and
   waiting for a period of time during which the mobile communication device is assumed to have access to short-range wireless communication to attempt to communicate with the remote computing device, by the mobile communication device.

8. The method of claim 7 wherein scanning, by the mobile communication device, for access to short-range wireless communication further comprises:
   turning on a short-range wireless communication interface, by the mobile communication device;
   scanning, by the mobile communication device, for available identifiers of wireless local area networks;
   determining, by the mobile communication device, whether at least one available identifier of a wireless local area network is currently usable by the mobile communication device; and
   performing at least one additional step, by the mobile communication device, responsive to whether at least one available identifier of a wireless local area network is currently usable by the mobile communication device.

9. The method of claim 8 wherein performing at least one additional step, by the mobile communication device, responsive to whether at least one available identifier of a wireless local area network is currently usable by the mobile communication device further comprising:

responsive to at least one available identifier of a wireless local area network being currently usable by the mobile communication device, communicating the unit of data with the remote computing device, by the mobile communication device, over the identified wireless network.

10. The method of claim 8 wherein performing at least one additional step, by the mobile communication device, responsive to whether at least one available identifier of a wireless local area network is currently usable by the mobile communication device further comprising:
  responsive to no available identifier of a wireless local area network being currently usable by the mobile communication device, turning off the short-range wireless network interface, waiting for a set period of time, and re-scanning for access to short-range wireless communication, by the mobile communication device.

11. The method of claim 1 wherein an indication that a unit of data is to be communicated between the mobile communication device and a remote computing device further comprises one from a group consisting of:
  an indication that the mobile communication device is to transmit a unit of data to a remote computing device; and
  an indication that the mobile communication device is to receive a unit of data from a remote computing device.

12. The method of claim 1 further comprising:
  detecting, by the mobile communication device, that a wired network access is currently available; and
  transmitting and receiving network traffic over wired network, by the mobile communication device, until the wired network access is no longer available.

13. The method of claim 1 wherein accessing, by the mobile communication device, a wireless access schedule further comprises performing a step from a group of steps consisting of:
  receiving, by the mobile communication device, a wireless access schedule from a user of the mobile communication device;
  using, by the mobile communication device, a default wireless access schedule; and
  building, by the mobile communication device, a wireless access schedule.

14. The method of claim 1 further comprising building, by the mobile communication device, a wireless access schedule, wherein building, by the mobile communication device, a wireless access schedule further comprises:
  during a training period, periodically 1) turning on a short-range wireless communication interface, by the mobile communication device, 2) determining, by the mobile communication device, a current time 3) scanning, by the mobile communication device, for available cellular tower identifiers, and 4) storing, by the mobile communication device, an entry in a log, the entry further documenting the results of scanning for available cellular tower identifiers; and
  after a conclusion of the training period, creating, by the mobile communication device, the wireless access schedule, based on the entries stored in the log, wherein the wireless access schedule further comprises identification of cellular tower identifiers associated with availability of at least one usable identifier of a wireless local area network.

15. The method of claim 1 wherein building, by the mobile communication device, a wireless access schedule further comprises:
  during a training period, periodically 1) turning on a short-range wireless communication interface, by the mobile communication device, 2) determining, by the mobile communication device, a current time 3) scanning, by the mobile communication device, for available identifiers of wireless local area networks, and 4) storing, by the mobile communication device, an entry in a log, the entry documenting the results of scanning for available identifiers of wireless local area networks and the current time; and
  after a conclusion of the training period, creating, by the mobile communication device, the wireless access schedule, based on the entries stored in the log, wherein the wireless access schedule further comprises periods of time at which the mobile communication device is assumed not to have access to short-range wireless communication.

16. The method of claim 1 wherein building, by the mobile communication device, a wireless access schedule further comprises:
  during a training period, periodically 1) turning on a short-range wireless communication interface, by the mobile communication device, 2) determining, by the mobile communication device, a current time 3) scanning, by the mobile communication device, for available identifiers of wireless local area networks, and 4) storing, by the mobile communication device, an entry in a log, the entry documenting the results of scanning for available identifiers of wireless local area networks and the current time; and
  after a conclusion of the training period, creating, by the mobile communication device, the wireless access schedule, based on the entries stored in the log, wherein the wireless access schedule further comprises information concerning times of access to short-range wireless communication for at least two separate modes.

17. At least one non-transitory computer readable storage medium storing program code, the program code being configured such that when loaded into system memory and executed by a processor, the processor performs the following steps:
  accessing a wireless access schedule, the wireless access schedule identifying at least one time period during which the mobile communication device is assumed to have access to short-range wireless communication;
  responsive to an indication that a unit of data is to be communicated between the mobile communication device and a remote computing device, determining a current time, and whether the current time is within a time period during which the mobile communication device is assumed to have access to short-range wireless communication; and
  managing the communication of the unit of data with the remote computing device according to whether the current time is within a time period during which the mobile communication device is assumed to have access to short-range wireless communication.

18. The at least one non-transitory computer readable storage medium of claim 17 further comprising program code being configured such that when loaded into system memory and executed by a processor, the processor performs the following additional steps:
  assigning, by the mobile communication device, urgency ratings to units of data to be communicated between the mobile communication device and remote computing devices; and
  managing, by the mobile communication device, the communication of the unit of data with the remote computing device according to 1) the urgency rating of the unit of data and 2) whether the current time is within a time period during which the mobile communication device is assumed to have access to short-range wireless communication.

19. The at least one non-transitory computer readable storage medium of claim 17 further comprising program code being configured such that when loaded into system memory and executed by a processor, the processor performs the following additional steps:
  detecting, by the mobile communication device, that a wired network access is currently available; and
  transmitting and receiving network traffic over wired network, by the mobile communication device, until the wired network access is no longer available.

20. A mobile communication device comprising:
  a processor;
  system memory;
  at least one storage medium;
  a short-range wireless network interface;
  a clock;
  a battery;
  an accessing component, configured to access a wireless access schedule, the wireless access schedule identifying at least one time period during which the mobile communication device is assumed to have access to short-range wireless communication;
  a determining component, configured to determine a current time and whether the current time is within a time period during which the mobile communication device is assumed to have access to short-range wireless communication, responsive to an indication that a unit of data is to be communicated between the mobile communication device and a remote computing device; and
  a communication managing component, configured to manage the communication of the unit of data with the remote computing device according to whether the current time is within a time period during which the mobile communication device is assumed to have access to short-range wireless communication.

* * * * *

UNITED STATES PATENT AND TRADEMARK OFFICE
CERTIFICATE OF CORRECTION

| | | |
|---|---|---|
| PATENT NO. | : 8,412,101 B1 | Page 1 of 1 |
| APPLICATION NO. | : 13/459029 | |
| DATED | : April 2, 2013 | |
| INVENTOR(S) | : Srinivasan Keshav | |

It is certified that error appears in the above-identified patent and that said Letters Patent is hereby corrected as shown below:

In the Claims

Claim 6, Col. 10, line 23, replace "according whether" with "according to whether"

Signed and Sealed this
Thirty-first Day of December, 2013

Margaret A. Focarino
*Commissioner for Patents of the United States Patent and Trademark Office*